(12) United States Patent
Malik et al.

(10) Patent No.: US 11,928,518 B2
(45) Date of Patent: Mar. 12, 2024

(54) NOISY-NEIGHBOR DETECTION AND REMEDIATION

(71) Applicant: KYNDRYL, INC., New York, NY (US)

(72) Inventors: Nadeem Malik, Austin, TX (US); Anil Kumar Narigapalli, Hyderabad (IN); Rajeshwar Coimbatore Shankar, Dublin, CA (US); Anupama Ambe, Pleasanton, CA (US)

(73) Assignee: Kyndryl, Inc., New York, NY (US)

( * ) Notice: Subject to any disclaimer, the term of this patent is extended or adjusted under 35 U.S.C. 154(b) by 436 days.

(21) Appl. No.: 17/398,196

(22) Filed: Aug. 10, 2021

(65) Prior Publication Data

US 2023/0045896 A1    Feb. 16, 2023

(51) Int. Cl.
*G06F 9/50*    (2006.01)
*G06F 11/07*    (2006.01)
*G06F 11/30*    (2006.01)

(52) U.S. Cl.
CPC ............ *G06F 9/505* (2013.01); *G06F 9/5077* (2013.01); *G06F 11/0793* (2013.01); *G06F 11/0709* (2013.01); *G06F 11/3006* (2013.01); *G06F 2209/5021* (2013.01); *G06F 2209/508* (2013.01)

(58) Field of Classification Search
None
See application file for complete search history.

(56) References Cited

U.S. PATENT DOCUMENTS

| 7,673,189 B2 | 3/2010 | Duyanovich et al. |
| 7,711,520 B2 | 5/2010 | Duyanovich et al. |
| 7,822,844 B2 | 10/2010 | Oulu et al. |
| 9,141,792 B2 | 9/2015 | Baluda et al. |

(Continued)

FOREIGN PATENT DOCUMENTS

WO    2013072232 A1    5/2013

OTHER PUBLICATIONS

Bouattour et al.; "Root Cause Analysis of Noisy Neighbors in a Virtualized Infrastructure"; 2020 IEEE; (Bouattour_2020.pdf; pp. 1-6) (Year: 2020).*

(Continued)

*Primary Examiner* — Hiren P Patel
(74) *Attorney, Agent, or Firm* — CANTOR COLBURN LLP; Dan Housley (57) ABSTRACT

Noisy-neighbor detection and remediation is provided by performing real-time monitoring of workload processing and associated resource consumption of application components that use shared resource(s) of a computing environment, determining workload and shared resource consumption patterns for each of the application components, for each application, of a plurality of applications, that includes at least one application component of the application components, correlating the determined workload and shared resource consumption patterns of each of those application component(s) and determining a correlated shared resource usage pattern for that application, performing impact analysis to determine impact of the applications on each other, and identifying noisy-neighbor(s) that use the one or more shared resources and automatically raising an alert indicating those noisy-neighbor(s).

17 Claims, 6 Drawing Sheets

(56) References Cited

U.S. PATENT DOCUMENTS

| | | | |
|---|---|---|---|
| 9,355,007 B1 | 5/2016 | Eicher | |
| 9,998,483 B2* | 6/2018 | Sukhomlinov | G06F 9/45558 |
| 10,547,521 B1* | 1/2020 | Roy | H04L 41/0895 |
| 10,560,309 B1* | 2/2020 | Chitalia | H04L 41/40 |
| 10,868,742 B2* | 12/2020 | Chitalia | H04L 43/045 |
| 10,915,425 B2 | 2/2021 | Wang | |
| 10,956,253 B2 | 3/2021 | Della Corte et al. | |
| 11,068,314 B2* | 7/2021 | Roy | G06N 20/00 |
| 11,086,646 B2* | 8/2021 | Mitra | G06F 9/45533 |
| 11,163,606 B1* | 11/2021 | Hampton | G06F 9/505 |
| 11,323,327 B1* | 5/2022 | Chitalia | H04L 63/104 |
| 11,593,136 B2* | 2/2023 | Galles | H04L 49/3009 |
| 2009/0320021 A1 | 12/2009 | Pan et al. | |
| 2012/0284408 A1* | 11/2012 | Dutta | H04L 67/1001 709/226 |
| 2013/0060933 A1* | 3/2013 | Tung | H04L 41/5003 709/224 |
| 2015/0236971 A1* | 8/2015 | Sesha | H04L 47/70 709/226 |
| 2018/0287902 A1* | 10/2018 | Chitalia | G06F 11/327 |
| 2020/0057547 A1 | 2/2020 | Rose et al. | |
| 2021/0089222 A1 | 3/2021 | Rawal et al. | |
| 2021/0191759 A1* | 6/2021 | Fong | G06N 20/00 |
| 2022/0398021 A1* | 12/2022 | Dutta | G06N 20/00 |
| 2023/0045896 A1* | 2/2023 | Malik | G06F 11/0793 |

OTHER PUBLICATIONS

Margolin et al.; "Using Machine Learning to Detect Noisy Neighbors in 5G Networks"; arXiv:1610.07419v1 [cs. NI] Oct. 24, 2016; (Margolin_2016.pdf; pp. 1-4) (Year: 2016).*

Tomas et al.; "Reducing Noisy-Neighbor Impact with a Fuzzy Affinity-Aware Scheduler"; 2015 International Conference on Cloud and Autonomic Computing; IEEE (Tomas_2015.pdf; pp. 33-44) (Year: 2015).*

Lloyd et al.; "Mitigating Resource Contention and Heterogeneity in Public Clouds for Scientific Modeling Services"; 2017 IEEE International Conference on Cloud Engineering; (Llyod_2017.pdf; pp. 159-166) (Year: 2017).*

Mell, Peter, et al., "The NIST Definition of Cloud Computing", NIST Special Publication 800-145, Sep. 2011, Gaithersburg, MD, 7 pgs.

* cited by examiner

NOISY-NEIGHBOR DETECTION AND REMEDIATION

BACKGROUND

It is common in a cloud-based computing environment to share resources of the cloud environment between different customers, or "tenants", having their own individual workloads to process. Such shared resources may be hardware and/or software. Shared hardware is often provided by a collection of different physical devices. Shared resources can be divided out for temporary or dedicated use to computing nodes (or just "nodes") of the environment for performing tasks and activities, for instance to execute specific software, and nodes can be grouped into "clusters" to facilitate administrative or other management activities. Resource consumption by an application, a node, a cluster, a group of nodes servicing a particular tenant, or another component (as examples) might be dynamic and/or conform to a pattern based on point-in-time workloads of the component.

SUMMARY

Shortcomings of the prior art are overcome and additional advantages are provided through the provision of a computer-implemented method. The method performs real-time monitoring of workload processing and associated resource consumption of application components that use shared resource(s) of a computing environment. The method also determines, based on the monitoring, workload and shared resource consumption patterns for each of the application components. Then, for each application, of a plurality of applications, that includes a respective at least one application component of the application components, the method correlates the determined workload and shared resource consumption patterns of each of the respective at least one application component of that application and determines a correlated shared resource usage pattern for that application. The correlating thereby provides correlated shared resource usage patterns for the plurality of applications. The method continues by performing impact analysis in real-time to determine impact of the plurality of applications on each other. Performing the impact analysis uses an anomaly detector that is provided the correlated shared resource usage patterns as time-based inputs to the anomaly detector. The method additionally identifies, based on the impact analysis, noisy-neighbor(s) that use the shared resource(s), and automatically raises an alert indicating the noisy-neighbor(s).

Further, a computer system is provided that includes a memory and a processor in communication with the memory, wherein the computer system is configured to perform a method. The method performs real-time monitoring of workload processing and associated resource consumption of application components that use shared resource(s) of a computing environment. The method also determines, based on the monitoring, workload and shared resource consumption patterns for each of the application components. Then, for each application, of a plurality of applications, that includes a respective at least one application component of the application components, the method correlates the determined workload and shared resource consumption patterns of each of the respective at least one application component of that application and determines a correlated shared resource usage pattern for that application. The correlating thereby provides correlated shared resource usage patterns for the plurality of applications. The method continues by performing impact analysis in real-time to determine impact of the plurality of applications on each other. Performing the impact analysis uses an anomaly detector that is provided the correlated shared resource usage patterns as time-based inputs to the anomaly detector. The method additionally identifies, based on the impact analysis, noisy-neighbor(s) that use the shared resource(s), and automatically raises an alert indicating the noisy-neighbor(s).

Yet further, a computer program product including a computer readable storage medium readable by a processing circuit and storing instructions for execution by the processing circuit is provided for performing a method. The method performs real-time monitoring of workload processing and associated resource consumption of application components that use shared resource(s) of a computing environment. The method also determines, based on the monitoring, workload and shared resource consumption patterns for each of the application components. Then, for each application, of a plurality of applications, that includes a respective at least one application component of the application components, the method correlates the determined workload and shared resource consumption patterns of each of the respective at least one application component of that application and determines a correlated shared resource usage pattern for that application. The correlating thereby provides correlated shared resource usage patterns for the plurality of applications. The method continues by performing impact analysis in real-time to determine impact of the plurality of applications on each other. Performing the impact analysis uses an anomaly detector that is provided the correlated shared resource usage patterns as time-based inputs to the anomaly detector. The method additionally identifies, based on the impact analysis, noisy-neighbor(s) that use the shared resource(s), and automatically raises an alert indicating the noisy-neighbor(s).

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Sometimes an application, specific component/sub-process of an application, a specific node, a group of tenant nodes servicing a particular tenant, or another component consumes shared resources to such an extent that it negatively impacts the performance of other resources consumers and/or the ability for those consumers to meet certain performance requirements. Such component is referred to as a "noisy-neighbor". A noisy-neighbor performing workload of one tenant might monopolize or dominate use of a shared resource such that other nodes or applications servicing workload for another tenant lack sufficient resources, and therefore underperform. Additionally or alternatively, the nodes of an application within a tenant environment can also affect another application of the same tenant operating on other nodes. In this context, the nodes of multiple applications of a specific tenant can be using the shared resources. Shared resources typically involved in a noisy-neighbor situation are hardware resources, examples of which include, but are not limited to, network (e.g. bandwidth), disk input/output utilization, processing (CPU), and storage resources of a cloud environment. Described herein are approaches for noisy-neighbor detection and remediation in cloud environments. In an example embodiment, a process performs correlative analysis of process, workload, and resource consumption characteristics related to each application component of multiple different applications and determines respective process, workload, and resource consumption patterns. It then applies anomaly detection (e.g. using unsupervised machine learning) in conjunction with a cognitive impact analysis based those patterns to detect anomalies that inform of noisy-neighbor situations and identify noisy-neighbor(s). Actions can then be taken to fix existing and/or avoid future noisy-neighbor situations.

Figure 1:
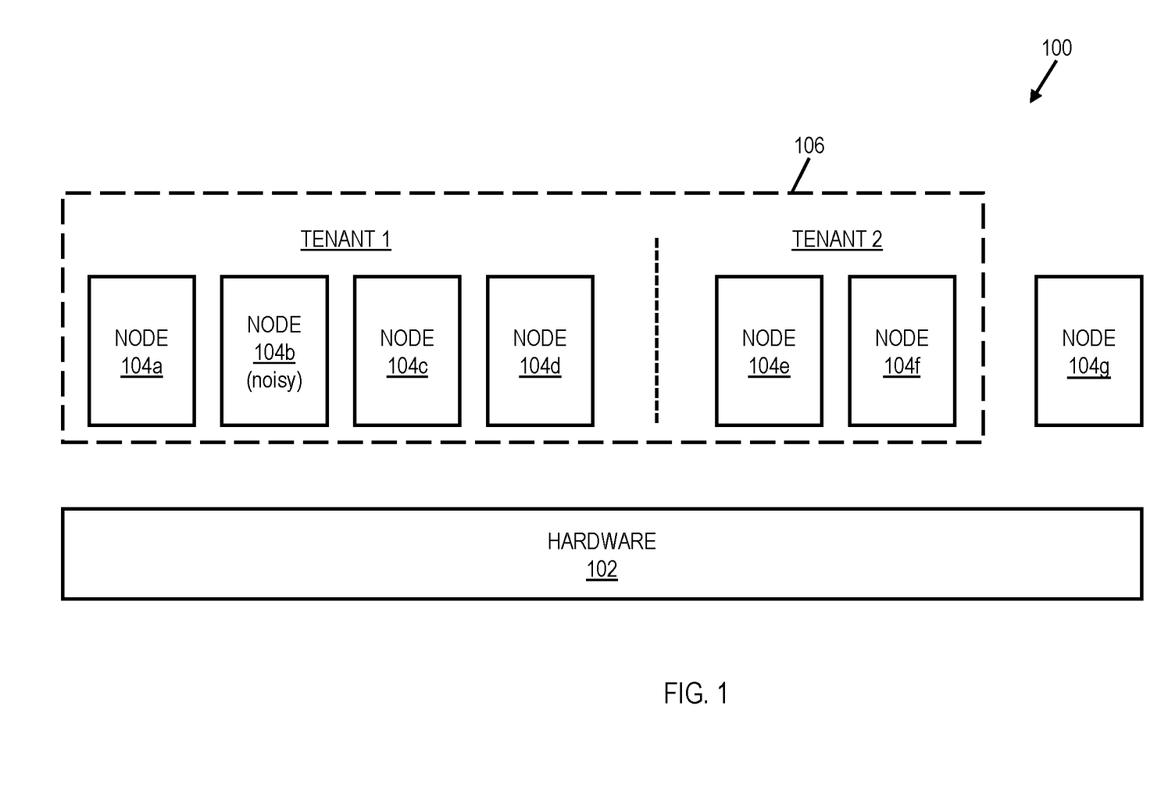
FIG. 1 depicts an example environment to incorporate and/or use aspects described herein.

FIG. 1 depicts an example environment to incorporate and use aspects described herein. Environment 100 is a computing environment, particularly a cloud environment with nodes 104a, 104b, . . . , 104g executing above hardware 102. Example types of nodes are virtual machines and containers. Hardware 102 is provided by multiple physical devices (not pictured) and can encompass any kind of shared hardware resources of the environment. Examples include, but are not limited to, processors, physical memory, storage devices, network hardware, and input/output facilities.

Nodes 104a, 104b, . . . , 104g are allocated portions of different hardware resources at various times to perform workload via the execution of applications. For instance, a node may be allocated respective amounts of processor, memory, storage, and network bandwidth resources for a given timeframe during which the node is to execute. The node may be allocated lesser or greater amounts of resources during another timeframe. In general, the allocations to each node are independent of each other and the total allocations made across the nodes may exceed total physical resource capacity. However, in these situations, and depending on actual consumption, there may be contention among the nodes for allocated resources because the hardware resources are finite.

Each node serves specification application(s) (not pictured). This may include entire application(s) and/or components thereof, for instance sub-process(es) of the application(s). Multiple nodes may be used to collectively process an application, with each node processing components of that application. An example application or application component is a microservice or other type of service. As noted, each node is allocated resources from the underlying hardware 102, which is shared across the multiple nodes 104. Application components of the nodes use the shared resources in their execution and performance of tasks, for instance to process/complete a workload. Specific resource allocations can be made to each of different application(s) and/or application components of the nodes.

In the example of FIG. 1, the cloud environment is a multi-tenant environment in which a single cluster 106 of nodes services workload of two tenants, "Tenant 1" and "Tenant 2". Cluster 106 includes nodes 104a, 104b, 104c and 104d performing workload for Tenant 1, and nodes 104e and 104f performing workload for Tenant 2. Though no node of cluster 106 is shared by both Tenants 1 and 2 in this example, in other examples multiple tenants might share a node, meaning the node processes application component(s) for each of the multiple tenants. Node 104g is not part of cluster 106 in this example but shares some of underlying hardware 102 with the nodes of cluster 106. Node 104g might process workload of a third tenant or other entities. In any case, the execution of node 104g may have an impact on availability of resources to nodes of cluster 106, and vice versa.

Noisy-neighbor situations can be difficult to identify and adequately address. Resource consumption can be dynamic or follow patterns at various times based on the point-in-time workload levels being serviced. One common and static approach to help address the noisy-neighbor problem is to put a hard limit on the resources consumed by a specific host/application, but this could restrict the host/application from being able to handle varying levels of workload. Other approaches are to dedicate a set level of resources for a specific application and/or to over-provision resources, but these negatively impact the cost of operations. Over-provisioning might provision 12 units of CPU resource to a component that typically uses 10 units of CPU, for instance. This means the component might at times underutilize what has been provisioned to it, perhaps to the detriment of other components that could use the resources during those times.

What is needed and is provided in accordance with aspects herein is an approach to dynamically allocate appropriate amounts of resources based on application profiles and workload metrics, identifying noisy-neighbor(s) in real-time and providing a way to arrest the impact of the noisy-neighbor(s) on other components (e.g. applications, nodes, etc.). Aspects use anomaly detection in combination with a cognitive impact analysis based on the relative workload patterns among a set of applications and components thereof that utilize shared resources.

An example process performs real-time workload/process behavior analysis and associated resource pattern analysis to determine resource consumption patterns. Application components, for instance sub-processes, perform workload processing and consume shared resource(s) of the computing environment in performing workload processing. This workload processing and associated resource consumption is monitored and measured in real-time as the workload is processed. Each application component executes as part of a respective application on a respective node. Both workload and resource consumption can be measured at any desired level of granularity, for instance per application component, per application, per node, and/or per cluster. In general, the consumption by an application may be a function of the consumption of components of the application, the consumption by a node may be a function of the consumption of the components executing on the node, and consumption by a cluster may be a function of the consumption of the nodes of the cluster. Furthermore, various components such as nodes and applications can be associated with a particular tenant and each tenant's workload processing and resource consumption can also be monitored as a function of the consumption by the components executing on behalf of that tenant.

The monitoring can occur on an ongoing basis. Periodically or aperiodically the process determines, based on the monitoring, patterns of the workload and shared resource consumption. Again, such patterns can be determined at any desired granularity, e.g. application component, application, node, cluster, tenant, etc. Thus, for each application that has a component for which the workload and resource consumption was monitored, the process can correlate the determined workload and shared resource consumption patterns of each of the application component(s) of that application and determine an overall usage pattern for that application. This is referred to herein as a 'correlated shared resource usage pattern' for that application. This correlating can be done for each of the multiple applications involved to thereby provide multiple correlated shared resource usage patterns, i.e. one for each of the multiple applications. With the workload processing and associated resource consumption patterns and application shared resource usage patterns, the consumption by node, cluster, tenant, etc. can be determined.

The monitoring, pattern determination, and correlating can be done on an ongoing basis to continually update as workload is processed. Periodically or aperiodically the process can perform a cognitive impact analysis, dynamically and in real time, using anomaly detection and based on relative workload patterns of the applications to determine the impacts of the various applications on each other. Specifically, the anomaly detector can be provided the correlated shared resource usage patterns discussed above as time-based inputs to the anomaly detector, enabling the anomaly detector to identify anomalies both in the reflected data (indicative of past anomalies) and predictively for certain times in the future. For instance, the patterns might reflect that, historically, Sunday mornings at 5:00 AM are times of high CPU demand by a specific node (caused by usage of specific application(s)/application component(s) on the node) that is a noisy-neighbor to other nodes of the same cluster. It can be predicted therefore that at 5:00 AM of the upcoming Sunday there is expected to be a noisy-neighbor situation to proactively address. In this manner, the process can identify, based on the impact analysis, noisy-neighbor(s) that use the shared resource(s). Appropriate actions, such as automatically raising an alert indicating the actual or predicted noisy-neighbor(s) and/or performing remedial actions, can be taken at that point.

A noisy-neighbor could be an application or application component executing on one node that impacts another application or application component executing on that same node or on a different node. The different node might be part of a same cluster, a different cluster, or a node that is not in a cluster of the cloud environment but that shares resources with the other nodes. In some cases, the impacted component is a component (application, application component, node, cluster, etc.) performing workload for another tenant. The consumption by one node as a whole based on applications/application components it is executing might render the node a noisy-neighbor for another node within or without the same cluster. At a less granular level, one cluster may be considered a noisy-neighbor to another cluster executing on the shared resources. Accordingly, there are varying levels of granularity in terms of the particular component that is regarded as a noisy-neighbor for another component, and noisiness may be considered at any of varying levels of granularity—application component, application, node, cluster, and tenant being examples. Thus, the noisy-neighbor could be, for instance, an application composed of application components, a computing node executing application component(s), and/or a tenant for which a workload is performed by at least one application using the one or more shared resources, as examples.

In any case, an effect of a noisy-neighbor is prevention or delay in another component performing some request(s). For instance, a system must delay the handling of an application's request due to another application's resource consumption. In this manner, consumption of shared resources by application(s) impact consumption by other application(s).

Cognitive impact analysis develops an understanding of the processes/sub-processes related to each application component running on a node in support of an overall application and analyzes impact as between the applications. For example, an application may be running batch jobs, database queries, receiving messages from a Kafka topic, etc. Each of these sub-processes have associated with them a usage pattern of the resources. An overall usage pattern for an application can be a function (such as the sum) of the usages of the constituent sub-processes (application components) of that application. Thus, at any point in time, the overall usage pattern of an application, aggregated from its sub-processes, can be based on the sum of the demands from each of the sub-processes. These activities can be performed by a correlation engine. This can be mapped to the underlying hardware to see, at any given point in time, a level of resources the application as a whole is expected to consume at that point in time and therefore should be provisioned for that point in time. This can be done on a resource-by resource basis.

A cognitive engine can use the correlation engine to disambiguate the overall usage pattern applicable to one or more shared resources as a time series of inputs to a multivariate anomaly detector configured to identify a noisy-neighbor, for instance an application that has impacted, is impacting, or is predicted to impact another application. Thus, the impact analysis can determine based on forecasted usage patterns noisy-neighbor(s) for each of the application. The historical usage/metrics of the applications as reflected in the monitored/measured data of application component consumption can based used to determine how an application is performing and what its resource consumption has been for each of the shared resources relative to different times. This can also be used to forecast usage patterns for each application and predict an impact, in terms of availability of individual resources, of one application on another application that will happen at a future point in time. If this analysis suggests with some threshold level of confidence that a shared resource is expected to become a bottleneck and result in a noisy-neighbor situation, it can trigger some automatic actions, such as rebalancing resource allocation and timing thereof, and/or raising an alert or other communication to a support team, as examples. Such remedial action can be taken prior to the future point in time at which the noisy-neighbor situation is expected to occur in order to facilitate avoiding realization of the predicted impact. The remedial action could be to schedule an action to be automatically taken, now or later, to control resource allocation (timing, amount, duration, etc.) of the shared resource(s) to the noisy-neighbor, for instance. In a particular example, the rebalance/resource allocation affects resource(s) provisioned to one or more nodes. A rebalance might provision more resource to node A at a specific time and for a specific duration when it is known that noisy-neighbor node B is expected to demand a high amount of that resource. Additionally or alternatively, the rebalance might specifically limit the amount of resource(s) provisioned to B at that time. All of this can be done at the specific resource level (network, CPU, etc.) and/or by specific node. In an example, one or more nodes, of a collection of nodes that execute a particular application, that is, or is expected to be, a noisy-neighbor can be temporarily turned off or paused. Resource allocation can be tracked and controlled at any desired level of granularity, for instance per application component, per application, per node, and/or per cluster, as examples, though fundamentally it is to the nodes that the hardware resources are allocated in order to perform workload. In yet a further example of a resource allocation adjustment, the shared resource pool could be expanded to make available additional shared resource(s) to satisfy predicted demand.

It is possible that more than one noisy-neighbor exists at a given point. A special case of this is when component A is a noisy-neighbor to component B with respect to a first resource but component B is a noisy-neighbor to component A with respect to a second resource, different from the first resource. Aspects discussed herein can identify and take corrective action to address these situations by way of resource allocation adjustments to remedy each noisy-neighbor situation.

Aspects described herein can be applied to all types of computing environments, for example public cloud, private cloud, and hybrid cloud environments, as well as on-premise environments where multiple tenants, applications and/or hosts are involved. Aspects provide dynamic, real-time detection of noisy-neighbors by creating patterns and time-based views of consumption that help in scheduling resource throttles to guarantee resources for application(s)/tenant(s) and facilitate containment of the impact of noisy-neighbor components on the other components of the environment. Aspects additionally provide automated remediation activities based on noisy-neighbor detection.

Figure 2:
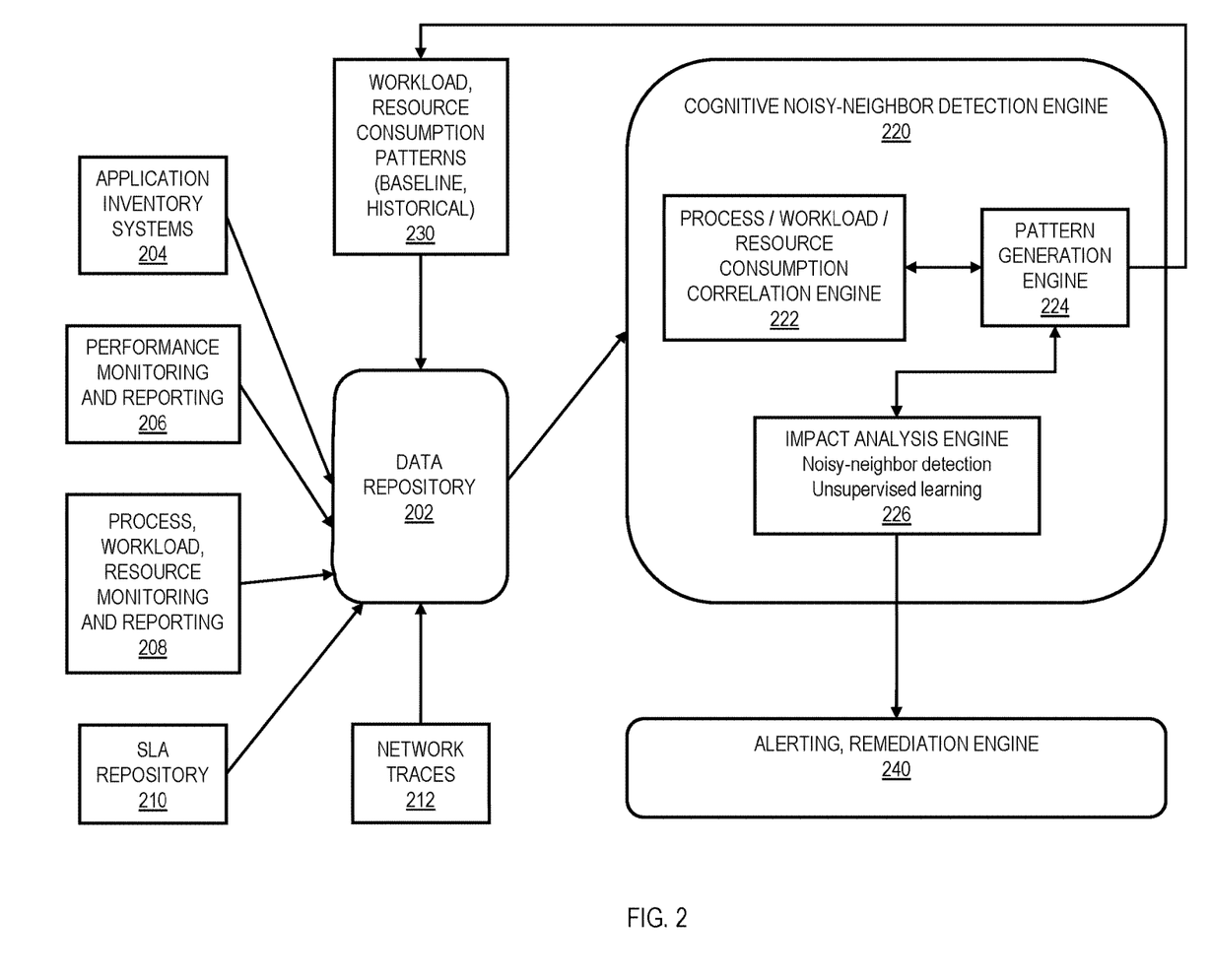
FIG. 2 depicts a conceptual diagram for noisy-neighbor detection and remediation, in accordance with aspects described herein.

FIG. 2 depicts a conceptual diagram for noisy-neighbor detection and remediation, in accordance with aspects described herein. Data repository 202 receives various feeds of data and other input. For instance, application inventory systems 204 provide application priority, inventory, and mapping data to the repository 202. The inventory data can indicate properties of the applications, including the application component(s) constituting each application. This can also include application-to-infrastructure mappings, tenancy information, infrastructure component details and properties such as device name, operating environment, make/model, information related to applications, such as application names, business function, servers hosting the applications, storage components storing data corresponding to the applications, application to host relationships, host to storage component relationships, and the like. Mapping data indicates the application(s) and tenants that each node services, as each node can process requests/workload of one or more applications on behalf of one or more tenants. Application priority data includes a respective application priority assigned to each application. Application priority might be useful when multiple nodes (or other components) impact each other. The impact analysis can use application priorities to resolve which application(s) are noisy-neighbor(s) to other application(s). If node 1 is handling higher priority tasks (i.e. for higher-priority application 1) than node 2 handles for lower-priority application 2, the cognitive noisy-neighbor detection engine 220 might favor node 1 handling higher-priority application 1 in resolving a conflict between the two nodes in terms of their resource consumption.

Performance monitoring and reporting component 206 provides a real time data feed to repository 202 of performance metrics and process, workload, resource monitoring and reporting component 208 provides a real time data fee to repository 202 of specific process, workload, and resource consumption metrics, which may be specific to an application, application sub-process, node, etc.

Service-Level Agreement (SLA) repository 210 provides input to the repository 202 as to the service-levels to provide to applications/tenants as were contractually agreed-upon. This can help the cognitive noisy-neighbor detection engine 220 characterize the impact to an application/tenant by another component. An SLA guaranteeing a relatively low level of service for one application or tenant might mean the impact of a 'noisy-neighbor' is much smaller on that application/tenant than on another application/tenant with an SLA guaranteeing a relatively high level of service. The impact may be so low that, in some situations, the neighbor may not even be considered a noisy-neighbor on account that the SLA would allow for servicing the impacted application/tenant at a later time without any violation of the SLA. Accordingly, different applications could perform workload for different tenants each having a respective service level agreement (SLA) dictating a service level, and an impact analysis can account for tenant SLAs in determining whether one application performing workload for one tenant is impacting, and is a noisy-neighbor for, another application performing workload for a different tenant.

Network traces component 212 provides a real time data feed to repository 202 of the traces (end-to-end paths) of transactions or other flows performed by or on behalf of components. In a banking transaction, for instance, the transaction may involve several components inputting and outputting data along a path. The network traces can reflect which components (endpoints) are along that path, the time and resources consumed at each component, and other information. If time/resources consumed at one endpoint is significantly greater than at other endpoints, more information about that one endpoint might be desired. The different endpoints could correlate to different nodes, sub-processes, applications, shared resources, etc.

Thus, the data repository 202 holds data for application-to-infrastructure mapping, application priorities, tenancy information, as well as data reflecting application infrastructure performance monitoring and reporting, resource consumption monitoring and reporting, and network traces. It also holds workload and resource consumption pattern data discussed in further detail below.

The data repository 202 provides a data feed to cognitive noisy-neighbor detection engine 220. The data provided can be pushed to the cognitive engine 220 and/or pulled by the cognitive engine 220, and can include any desired data of the data repository 202.

Specifically, data of the data repository 202 is provided to a process/workload/resources consumption correlation engine 222 of the cognitive noisy-neighbor detection engine 220. The process/workload/resources consumption correlation engine 222 performs process, workload, and resource consumption correlation in relation to application components, and with a view to the entire application ecosystem (e.g. across nodes). By performing real-time monitoring of, e.g., workload processing and associated resource consumption of the application components (such as consumption by sub-processes of the applications) that use shared resource(s) and of application performance of the applications, this can be correlated to generate insights as to the time-based consumption and performance by applications, tenants, nodes, etc.

Pattern Generation, Baselining Engine 224 can generate such insights in the form of resource allocation, consumption, and performance patterns. Such patterns could be individual to application components, applications, nodes, tenants, or other entities. In some examples, the engine determines, based on the monitoring discussed above, workload and shared resource consumption patterns for each of multiple applications, the multiple applications being any application with at least one application component that was monitored. For each application of those multiple applications, the engine 224 correlates the determined workload and shared resource consumption patterns of each of the respective application component(s) of that application and determines a correlated shared resource usage pattern for that application. In this manner, for a given application, the workload and shared resource consumption pattern(s) of each application component of that application can be aggregated to inform resource consumption/utilization for that application as a whole. Doing this across the multiple applications yields correlated shared resource usage patterns for those applications (e.g. one or more patterns for each application—for instance a pattern for each resource of the shared resources). Application performance patterns can be similarly determined from monitored application component performance patterns.

Resource allocation, consumption and performance patterns can also be generated by tenant. A component might not be a noisy-neighbor with respect to the other nodes of a given tenant but might be noisy with respect to node(s) of another tenant, for instance owing to the different SLAs that might exist for those tenants.

The patterns generated can inform baseline and historical performance that is fed back to the data repository 224, specifically via a workload, resource consumption pattern component 230 that provides this data as a data feed to repository 202. The patterns can be stored in repository 202 for archival and/or other purposes, including potential use by the impact analysis engine 226 (below) in monitoring trends in performance, workload, and/or resource consumption.

Impact Analysis Engine 226 performs correlative impact analysis of application components on each other, applications on each other, nodes on each other, clusters on each other, and/or tenants on each other, as examples. This impact analysis can be based on the developed patterns and performed in real-time based on, as one example, unsupervised machine learning-based anomaly detection. A specific example technology for this is the ElasticSearch® Machine Learning anomaly function, offered by Elasticsearch BV (of which ELASTIC SEARCH is a registered trademark).

In a specific embodiment, the impact analysis is performed in real-time to determine impact of the multiple applications on each other and uses an anomaly detector that is provided the correlated shared resource usage patterns as time-based inputs thereto. This allows the anomaly detector to detect anomalies that have occurred and/or predict anomalies that are expected to occur. An anomaly may indicate that one (or more) components have consumed/will consume shared resource(s) such that the impact on one (or more) other components presents a noisy-neighbor situation in which there are one or more noisy-neighbors for other component(s). Application performance patterns can help to inform impacts on application performance under different resource consumption or availability scenarios. For instance, unusually poor performance by one application might inform of a significant impact that another application's execution has on that application.

Based on the impact analysis, one or more noisy-neighbors that use the shared resource(s) are identified. The engine 226 can generate insights to an alerting and remediation engine 240, for instance to automatically raise an alert indicating the noisy-neighbor(s). In this regard, the alerting and remediation engine 240 can perform real-time alerting on the detected noisy-neighbor(s). The alerting can be to an administrator, stakeholder, administrative team, or any other desired target. In situations where tenants are customers of a service provider, the alert can be to an administrator/team of the service provider, and specifically those of the node(s) and/or cluster(s) of the involved and impacted components.

In addition, the alerting and remediation engine 240 can initiate and/or take remedial action(s) that affect resource allocation. This may be in order to arrest an impact of a noisy-neighbor on impacted component(s) using the shared resource(s). Corrective action(s) could be dynamically determined and taken at any desired time, either immediately or at a later time. In some examples, actions are determined and scheduled immediately to take place at a later time. In other examples, specific actions are not determined immediately but instead are determined at a later time and either implemented or scheduled.

Components of FIG. 2 and processing to perform aspects discussed in relation thereto can be implemented by/using one or more computer systems, such as those described herein.

Figure 3:
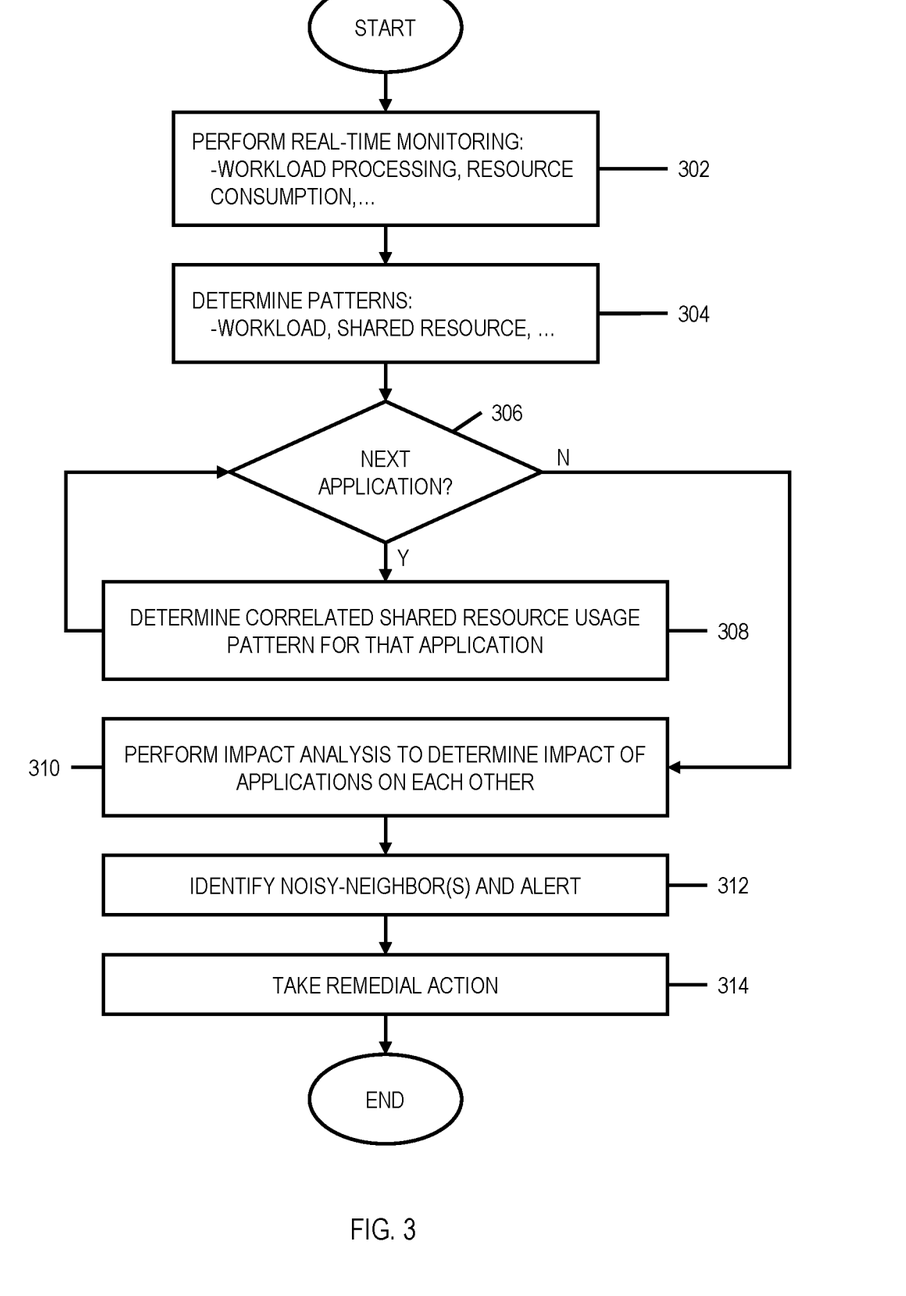
FIG. 3 depicts an example process for noisy-neighbor detection and remediation, in accordance with aspects described herein.

FIG. 3 depicts an example process for noisy-neighbor detection and remediation, in accordance with aspects described herein. In some examples, the process is performed by one or more computer systems, such as those described herein, which may include one or more computer systems of, or in communication with, a cloud computing environment and/or one or more other computer systems. The process performs (302) real-time monitoring of workload processing and associated resource consumption of a plurality of application components. The application components are components of a plurality of applications being executed and use one or more shared resources of a computing environment. Different application components might use different resource(s) (and amounts thereof) of the one or more shared resources. Example application components are processes/subprocess(es) of the applications executing on nodes of a computing environment, for instance a cloud environment having multiple nodes sharing hardware resources, to perform workloads. Example shared resources include CPU/processing capacity, network bandwidth, storage input/output (I/O) and capacity, and others.

The process proceeds by determining (304), based on the monitoring at 302, workload and shared resource consumption patterns for each of the plurality of application components. At that point the process enters a loop to determine a correlated shared resource usage pattern for each application of the plurality of applications, i.e. each application that includes at least one application component of those mentioned above that are being monitored and for which patterns are being determined. Thus, the process inquires (306) whether there is a next application for which to determine a correlated share resource usage pattern for that application. If so (306, Y), the process determines (308) a correlated shared resource usage pattern for that application. In an embodiment, it does this by correlating the determined workload and shared resource consumption patterns of each of the at least one application component of that application and determining (for instance as an aggregate of those) a correlated shared resource usage pattern for that application. Though 'correlated shared resource usage pattern' is used in the singular tense, it should be understood that such 'pattern' could refer to a collection of resource-specific patterns, each corresponding to a specific resource. For instance, the pattern determination and correlation could be done on a resource-by-resource basis if desired to produce, for each specific shared resource, a correlated resource usage pattern corresponding to that application and that specific resource.

The process then returns to 306 to inquire whether there is any next such application. In this manner, the process iteratively determines, for each of the applications having at least one application component discussed above, a correlated shared resource usage pattern for that application. This provides a plurality of correlated shared resource usage patterns for the plurality of applications, e.g. a respective pattern (which could encompass a collection of resource-specific patterns) for each application.

At some point there is no next application for which to determine a correlated shared resource usage pattern (306, N) and the process proceeds by performing (310) impact analysis to determine impact of the plurality of applications on each other. The impact analysis can be performed in real-time, e.g. as other aspects of the process of FIG. 3 are being performed. In this manner, the impact analysis can analyze for historical and current (in process) impact. It can also analyze for potential future impact.

In some examples, performing the impact analysis uses an anomaly detector that is provided the correlated shared resource usage patterns as time-based inputs to the anomaly detector, for instance as a time-series of indicated shared resource usage to inform of impact at discrete times or during discrete time intervals.

The process proceeds by identifying (312), based on the impact analysis, one or more noisy-neighbors that use the one or more shared resources and automatically raising an alert indicating the one or more noisy-neighbors. A noisy-neighbor could be an application component being monitored, an application of the plurality of applications, a computing node executing any of the monitored application components, a cluster of nodes, or a tenant for which workload is being performed by one or more of the applications, as examples. The process then automatically takes (314) remedial action(s) based on identifying the noisy-neighbor(s). As one example, the action could affect (i.e. set, change, remove, etc.) resource allocation in order to arrest an impact of a noisy-neighbor, of the one or more noisy-neighbors, on one or more impacted components that uses the shared resources. The impacted component(s) could include an application component being monitored, an application of the plurality of applications, a computing node executing any of the monitored application components, a cluster of nodes, or a tenant for which workload is being performed by one or more of the applications, as examples. In a particular example, the remedial action includes scheduling an action to be automatically taken to control resource allocation of the shared resource(s) to the noisy-neighbor and/or component(s) impacted thereby.

Different applications of the plurality of applications might perform workload for different tenants that each have a respective service-level agreement (SLA) in place. The SLA dictates a minimum service level that the tenant is to be provided by the cloud provider. Performing the impact analysis can account for tenant SLA(s) in determining whether an application performing workload for one tenant is impacting, and is a noisy-neighbor for, an application performing workload for a different tenant. While a first application of one tenant might impact a second application of another tenant, the impact may not rise to the level of the first application being a noisy-neighbor of the second application if, for instance, the cloud provider continues to satisfy the SLA in place for the other tenant.

Application priorities can be used to resolve conflicts as between applications or other entities competing for resources. For instance, each of the plurality of applications can be assigned a respective application priority, and the impact analysis can use the application priorities assigned to the application of a group (two or more) to resolve which application(s) are noisy-neighbors of other application(s) in the group. A first application with a relatively low application priority might conflict with a second application with a relatively high application priority if they are both competing for the same limited resource and only one can be dedicated the resource necessary to meet its requirements. In determining the impact, and ultimately determining which application is noisy for the other, the application priority might be used to resolve which is the noisy-neighbor. For instance, the first application might be deemed noisy to the second application since the second application is of higher priority. This can then inform resource allocation to the two applications, for instance.

In some examples the impact analysis predicts an impact of one application on another application that will happen at a future point in time, and the remedial action is taken prior to that future point in time in order to facilitate avoiding realization of the predicted impact.

In addition to the above, the monitoring (302) could include monitoring application performance of the plurality of applications, determining application performance patterns as part of 304, and using the determined application performance patterns in performing the impact analysis (310). For instance, monitoring performance be used to identify performance anomalies in an application, which could inform when and how the application is being impacted by a potential noisy-neighbor.

Although various examples are provided, variations are possible without departing from a spirit of the claimed aspects.

Figure 4:
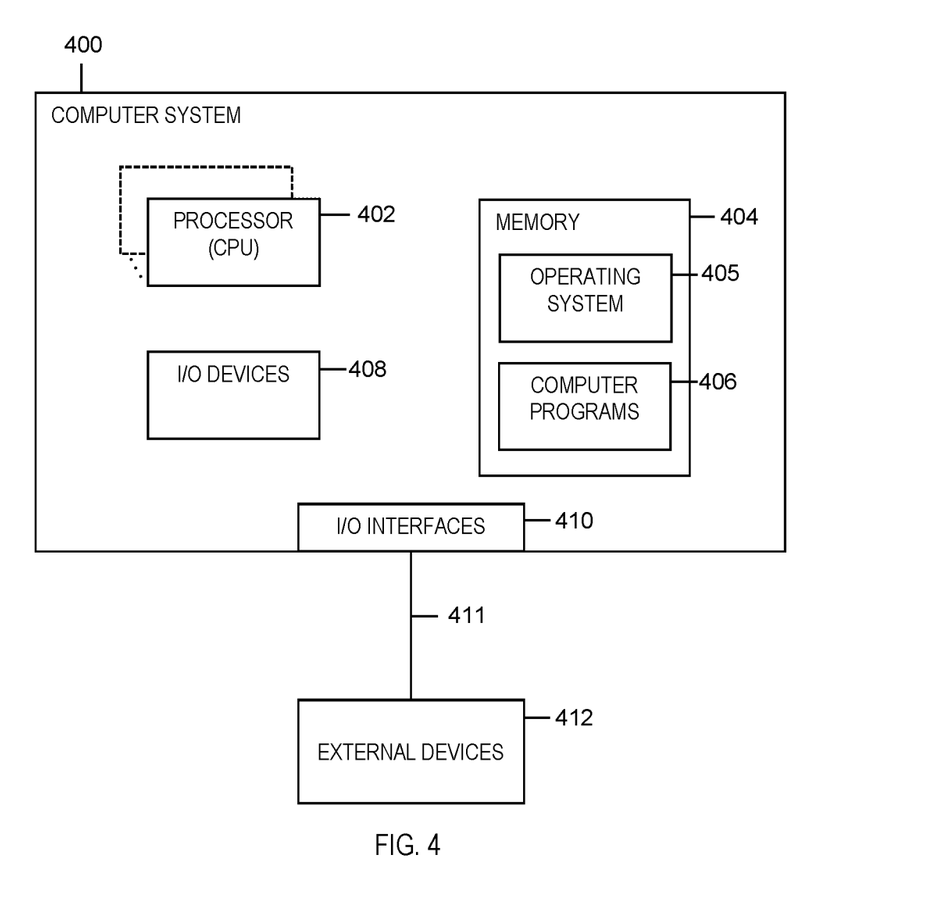
FIG. 4 depicts one example of a computer system and associated devices to incorporate and/or use aspects described herein.

Processes described herein may be performed singly or collectively by one or more computer systems. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
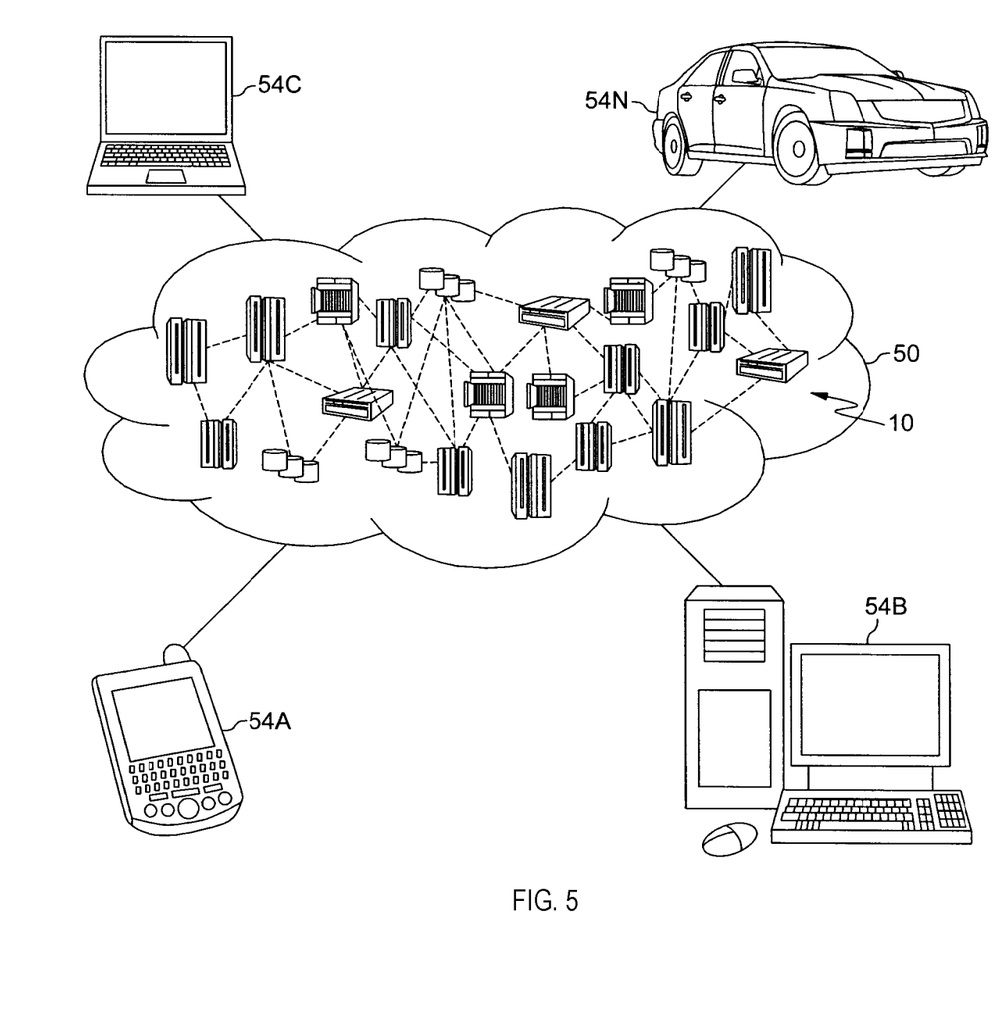
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
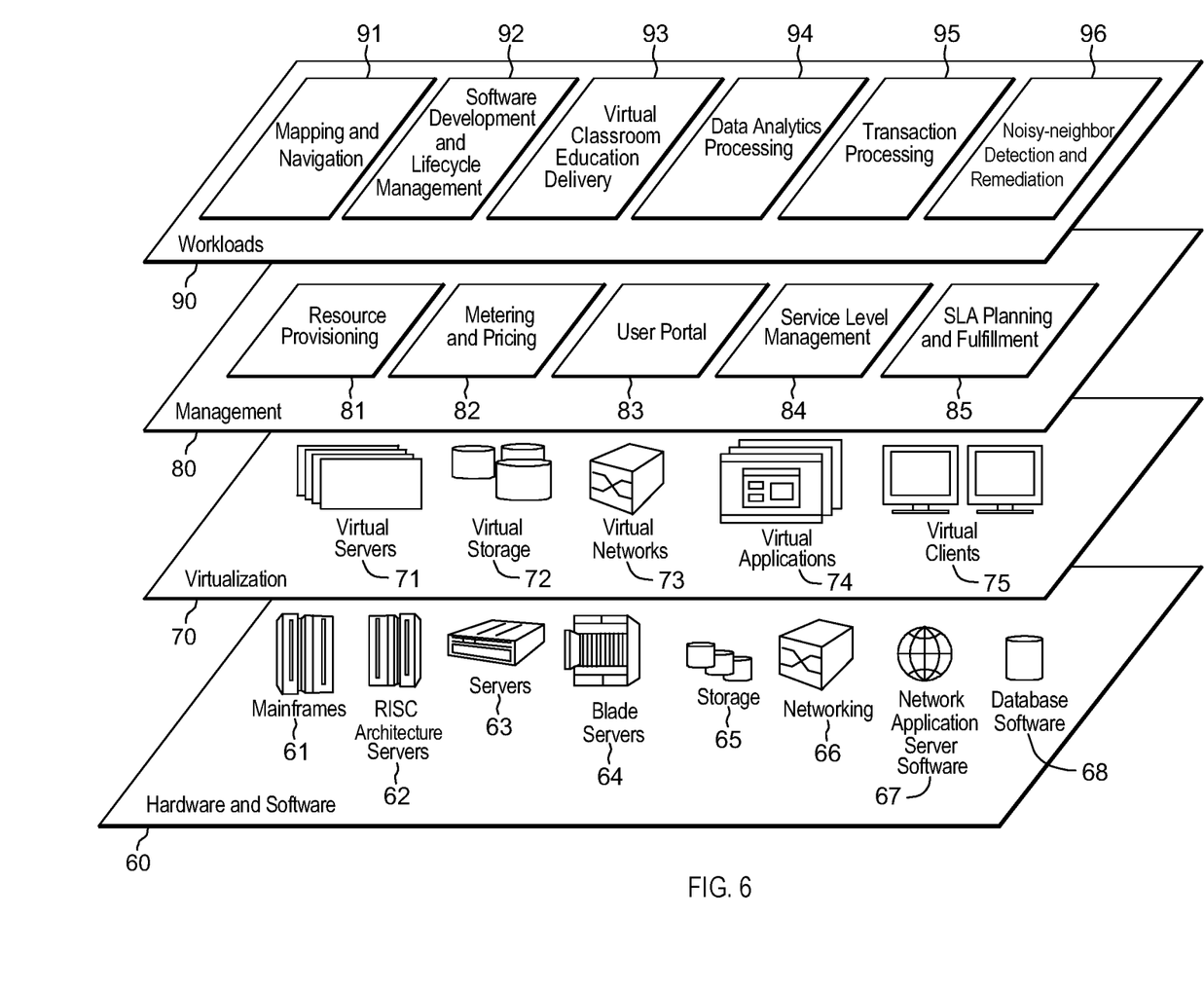
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and noisy-neighbor detection and remediation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
performing real-time monitoring of workload processing and associated resource consumption of a plurality of application components that use one or more shared resources of a computing environment;
determining, based on the monitoring, workload and shared resource consumption patterns for each of the plurality of application components;
for each application, of a plurality of applications, that includes a respective at least one application component of the plurality of application components, correlating the determined workload and shared resource consumption patterns of each of the respective at least one application component of that application and determining a correlated shared resource usage pattern for that application, wherein the correlating provides correlated shared resource usage patterns for the plurality of applications;
performing impact analysis in real-time to determine impact of the plurality of applications on each other, wherein the performing the impact analysis uses an anomaly detector that is provided the correlated shared resource usage patterns as time-based inputs to the anomaly detector;
wherein each of the plurality of applications is assigned a respective application priority, and wherein the performing the impact analysis uses application priorities of a group of applications to resolve one of the group of applications as being a noisy-neighbor to another application of the group of applications;
identifying, based on the impact analysis, one or more noisy-neighbors that use the one or more shared resources, and automatically raising an alert indicating the one or more noisy-neighbors; and
taking, based on the impact analysis, remedial action affecting resource allocation of the one or more shared resources to the one or more noisy-neighbors.

2. The method of claim 1, further comprising automatically taking the remedial action affecting resource allocation in order to arrest an impact of the noisy-neighbor, of the one or more noisy-neighbors, on one or more impacted components using the one or more shared resources.

3. The method of claim 2, wherein the impact analysis predicts an impact of one application on another application that will happen at a future point in time, and wherein the remedial action is taken prior to the future point in time to facilitate avoiding realization of the predicted impact.

4. The method of claim 2, wherein the remedial action comprises scheduling an action to be automatically taken, the action to control resource allocation of the one or more shared resources to the noisy-neighbor.

5. The method of claim 1, wherein different applications of the plurality of applications perform workload for different tenants each having a respective service-level agreement (SLA) dictating a service level, and wherein the performing the impact analysis accounts for one or more tenant SLAs in determining whether an application performing workload for one tenant is impacting, and is a noisy-neighbor for, an application performing workload for a different tenant.

6. The method of claim 1, further comprising monitoring application performance of the plurality of applications, determining application performance patterns, and using the determined application performance patterns in performing the impact analysis.

7. The method of claim 1, wherein an identified noisy-neighbor is at least one selected from the group consisting of: an application of the plurality of applications, a computing node executing one or more application components of the plurality of application components and allocated use of the one or more shared resources, and a tenant for which a workload is performed by at least one application, of the plurality of applications, using the one or more shared resources.

8. A computer system comprising:
a memory; and
a processor in communication with the memory, wherein the computer system is configured to perform a method comprising:
performing real-time monitoring of workload processing and associated resource consumption of a plurality of application components that use one or more shared resources of a computing environment;
determining, based on the monitoring, workload and shared resource consumption patterns for each of the plurality of application components;
for each application, of a plurality of applications, that includes a respective at least one application component of the plurality of application components, correlating the determined workload and shared resource consumption patterns of each of the respective at least one application component of that application and determining a correlated shared resource usage pattern for that application, wherein the correlating provides correlated shared resource usage patterns for the plurality of applications;
performing impact analysis in real-time to determine impact of the plurality of applications on each other, wherein the performing the impact analysis uses an anomaly detector that is provided the correlated shared resource usage patterns as time-based inputs to the anomaly detector;
wherein each of the plurality of applications is assigned a respective application priority, and wherein the performing the impact analysis uses application priorities of a group of applications to resolve one of the group of applications as being a noisy-neighbor to another application of the group of applications;
identifying, based on the impact analysis, one or more noisy-neighbors that use the one or more shared resources, and automatically raising an alert indicating the one or more noisy-neighbors; and
taking, based on the impact analysis, remedial action affecting resource allocation of the one or more shared resources to the one or more noisy-neighbors.

9. The computer system of claim 8, wherein the method further comprises automatically taking the remedial action affecting resource allocation in order to arrest an impact of the noisy-neighbor, of the one or more noisy-neighbors, on one or more impacted components using the one or more shared resources.

10. The computer system of claim 9, wherein the impact analysis predicts an impact of one application on another application that will happen at a future point in time, and wherein the remedial action is taken prior to the future point in time to facilitate avoiding realization of the predicted impact.

11. The computer system of claim 8, wherein different applications of the plurality of applications perform workload for different tenants each having a respective service-level agreement (SLA) dictating a service level, and wherein the performing the impact analysis accounts for one or more tenant SLAs in determining whether an application performing workload for one tenant is impacting, and is a noisy-neighbor for, an application performing workload for a different tenant.

12. The computer system of claim 8, wherein an identified noisy-neighbor is at least one selected from the group consisting of: an application of the plurality of applications, a computing node executing one or more application components of the plurality of application components and allocated use of the one or more shared resources, and a tenant for which a workload is performed by at least one application, of the plurality of applications, using the one or more shared resources.

13. A computer program product comprising: a non-transitory computer readable storage medium readable by a processing circuit and storing instructions for execution by the processing circuit for performing a method comprising:
performing real-time monitoring of workload processing and associated resource consumption of a plurality of application components that use one or more shared resources of a computing environment;
determining, based on the monitoring, workload and shared resource consumption patterns for each of the plurality of application components;
for each application, of a plurality of applications, that includes a respective at least one application component of the plurality of application components, correlating the determined workload and shared resource consumption patterns of each of the respective at least one application component of that application and determining a correlated shared resource usage pattern for that application, wherein the correlating provides correlated shared resource usage patterns for the plurality of applications;
performing impact analysis in real-time to determine impact of the plurality of applications on each other, wherein the performing the impact analysis uses an anomaly detector that is provided the correlated shared resource usage patterns as time-based inputs to the anomaly detector;
wherein each of the plurality of applications is assigned a respective application priority, and wherein the performing the impact analysis uses application priorities of a group of applications to resolve one of the group of applications as being a noisy-neighbor to another application of the group of applications;
identifying, based on the impact analysis, one or more noisy-neighbors that use the one or more shared resources, and automatically raising an alert indicating the one or more noisy-neighbors; and
taking, based on the impact analysis, remedial action affecting resource allocation of the one or more shared resources to the one or more noisy-neighbors.

14. The computer program product of claim 13, wherein the method further comprises automatically taking the remedial action affecting resource allocation in order to arrest an impact of the noisy-neighbor, of the one or more noisy-neighbors, on one or more impacted components using the one or more shared resources.

15. The computer program product of claim 14, wherein the impact analysis predicts an impact of one application on another application that will happen at a future point in time, and wherein the remedial action is taken prior to the future point in time to facilitate avoiding realization of the predicted impact.

16. The computer program product of claim 13, wherein different applications of the plurality of applications perform workload for different tenants each having a respective service-level agreement (SLA) dictating a service level, and wherein the performing the impact analysis accounts for one or more tenant SLAs in determining whether an application performing workload for one tenant is impacting, and is a noisy-neighbor for, an application performing workload for a different tenant.

17. The computer program produce of claim 13, wherein an identified noisy-neighbor is at least one selected from the group consisting of: an application of the plurality of applications, a computing node executing one or more application components of the plurality of application components and allocated use of the one or more shared resources, and a tenant for which a workload is performed by at least one application, of the plurality of applications, using the one or more shared resources.

* * * * *